(12) United States Patent
Itamoto

(10) Patent No.: US 9,274,632 B2
(45) Date of Patent: Mar. 1, 2016

(54) PORTABLE ELECTRONIC DEVICE, TOUCH OPERATION PROCESSING METHOD, AND PROGRAM

(75) Inventor: Shinichi Itamoto, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/347,190

(22) PCT Filed: Sep. 11, 2012

(86) PCT No.: PCT/JP2012/073138
§ 371 (c)(1),
(2), (4) Date: Mar. 25, 2014

(87) PCT Pub. No.: WO2013/047182
PCT Pub. Date: Apr. 4, 2013

(65) Prior Publication Data
US 2014/0235297 A1    Aug. 21, 2014

(30) Foreign Application Priority Data

Sep. 27, 2011   (JP) .................................. 2011-210976

(51) Int. Cl.
| | | |
|---|---|---|
| H04M 1/00 | (2006.01) |
| H04B 1/38 | (2015.01) |
| G06F 3/041 | (2006.01) |
| G06F 3/0488 | (2013.01) |
| G06F 1/16 | (2006.01) |

(Continued)

(52) U.S. Cl.
CPC .............. *G06F 3/041* (2013.01); *G06F 1/1626* (2013.01); *G06F 1/1643* (2013.01); *G06F 1/1647* (2013.01); *G06F 3/0488* (2013.01); *G06F 3/04855* (2013.01); *H04M 1/0266* (2013.01); *H04M 1/236* (2013.01); *H04M 1/72519* (2013.01); *H04M 2250/22* (2013.01)

(58) Field of Classification Search
USPC ................ 455/566; 345/173–177; 348/51, 52
See application file for complete search history.

(56) References Cited

U.S. PATENT DOCUMENTS 7,924,271 B2 *  4/2011  Christie et al. ................. 345/173
8,049,730 B2 * 11/2011  Joguet ...................... G06F 3/041
                                                                 178/18.01

(Continued)

FOREIGN PATENT DOCUMENTS

| EP | 2341414 A1 | 7/2011 |
| JP | 2008263324 A | 10/2008 |

(Continued)

OTHER PUBLICATIONS

International Search Report issued for PCT/JP2012/073138, Dec. 11, 2012, 7 pages.

(Continued)

*Primary Examiner* — Dominic E Rego
(74) *Attorney, Agent, or Firm* — Wilmer Cutler Pickering Hale and Dorr LLP

(57) ABSTRACT

In a portable electronic device, time and effort of a user is reduced while performing mode switching that reflects the user's intention. The portable electronic device includes a first touch sensor, a second touch sensor, and a processing unit which performs a first process when the first touch sensor detects a touch operation and performs a second process related to the first process in place of the first process when the first touch sensor detects the touch operation and the second touch sensor detects a touch operation.

10 Claims, 12 Drawing Sheets

(51) Int. Cl.
 *G06F 3/0485* (2013.01)
 *H04M 1/02* (2006.01)
 *H04M 1/725* (2006.01)
 *H04M 1/23* (2006.01)

(56) References Cited

U.S. PATENT DOCUMENTS

| | | | |
|---|---|---|---|
| 8,115,749 B1* | 2/2012 | Simpson | 345/173 |
| 8,345,073 B1* | 1/2013 | Hebenstreit et al. | 345/174 |
| 8,471,819 B2* | 6/2013 | You | H04M 1/23 341/22 |
| 8,633,904 B2* | 1/2014 | Karpin et al. | 345/173 |
| 8,760,410 B2* | 6/2014 | Yoo et al. | 345/173 |
| 2006/0098167 A1* | 5/2006 | Sato | 353/35 |
| 2008/0317302 A1* | 12/2008 | Abdallah | G06F 21/32 382/124 |
| 2009/0013261 A1* | 1/2009 | Noda et al. | 715/750 |
| 2009/0040189 A1* | 2/2009 | Lee | 345/173 |
| 2009/0109181 A1* | 4/2009 | Hui et al. | 345/173 |
| 2009/0160812 A1* | 6/2009 | Huang et al. | 345/173 |
| 2009/0167692 A1* | 7/2009 | Tan et al. | 345/168 |
| 2009/0315834 A1 | 12/2009 | Nurmi et al. | |
| 2010/0100855 A1* | 4/2010 | Yoo | G06F 3/04883 715/863 |
| 2010/0134437 A1* | 6/2010 | Yang et al. | 345/174 |
| 2010/0259368 A1* | 10/2010 | Fahn | 340/384.1 |
| 2010/0328270 A1* | 12/2010 | Lin et al. | 345/175 |
| 2011/0074716 A1 | 3/2011 | Ono | |
| 2011/0096034 A1* | 4/2011 | Huang | 345/175 |
| 2011/0157055 A1 | 6/2011 | Tilley et al. | |
| 2011/0193791 A1* | 8/2011 | Tong et al. | 345/173 |
| 2011/0248928 A1* | 10/2011 | Michaelraj | 345/173 |
| 2011/0291951 A1* | 12/2011 | Tong | 345/173 |
| 2012/0113458 A1* | 5/2012 | Benedek | 358/1.15 |
| 2012/0216252 A1* | 8/2012 | Skaaksrud et al. | 726/3 |
| 2012/0299845 A1* | 11/2012 | Seo et al. | 345/173 |
| 2013/0057589 A1* | 3/2013 | Ohuchi | 345/660 |

FOREIGN PATENT DOCUMENTS

| | | |
|---|---|---|
| JP | 2010117842 A | 5/2010 |
| JP | 2011076233 A | 4/2011 |
| JP | 2011149749 A | 8/2011 |

OTHER PUBLICATIONS

Supplementary European Search Report issued by the European Patent Office for Application No. 12835820.7 dated Apr. 2, 2015 (6 pages).

* cited by examiner

FIG. 8

| NAME | PHONE NUMBER 1 | ... | SECRET | |
|---|---|---|---|---|
| Mr. or Ms. A | 0903456... | ... | NO | ⌐L201 |
| Mr. or Ms. B | 0902121... | ... | YES | ⌐L202 |
| Mr. or Ms. C | 0905555... | ... | NO | ⌐L203 |
| ⋮ | ⋮ | ⋮ | ⋮ | |

FIG. 12
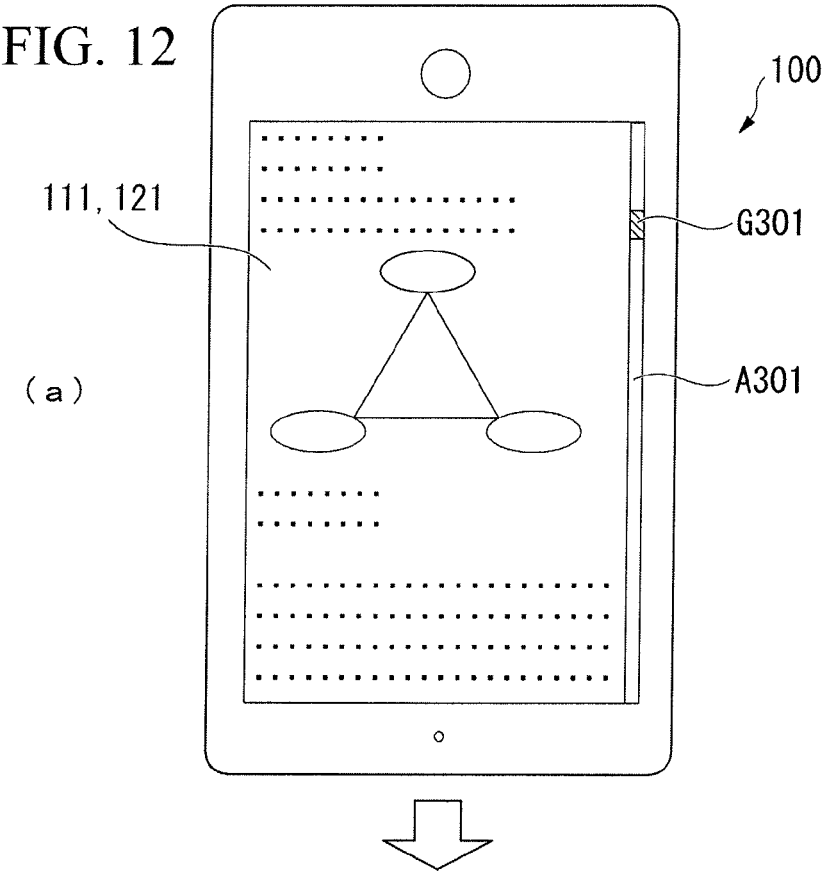
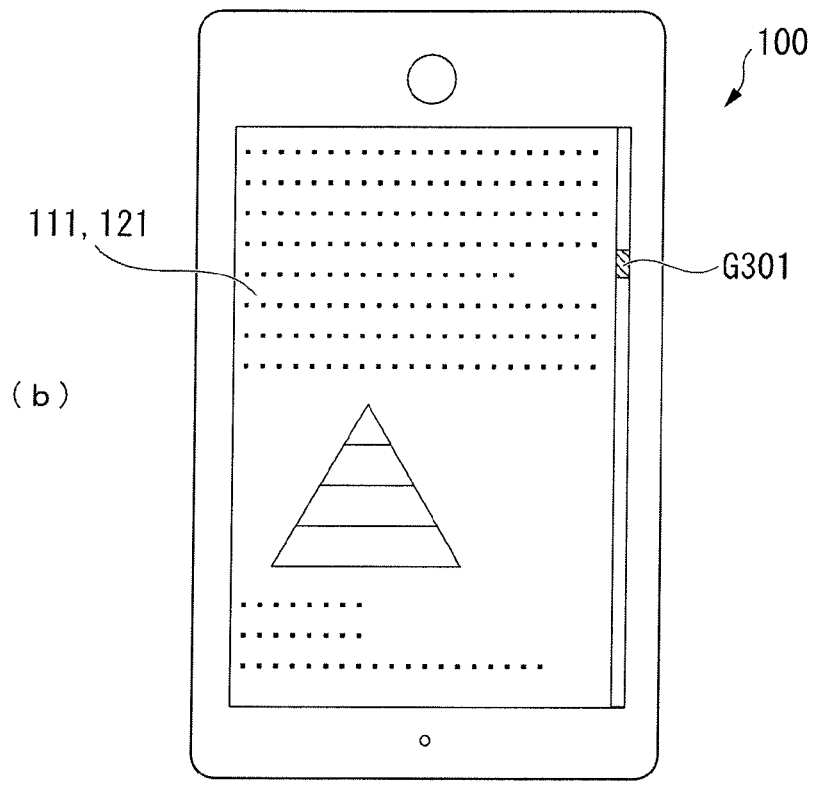

PORTABLE ELECTRONIC DEVICE, TOUCH OPERATION PROCESSING METHOD, AND PROGRAM

CROSS-REFERENCE TO RELATED APPLICATIONS

This application is a national stage application of International Application No. PCT/JP2012/073138 entitled "Portable Electronic Device, Touch Operation Processing Method, And Program," filed on Sep. 11, 2012, which claims the benefit of the priority of Japanese patent application No. 2011-210976, filed on Sep. 27, 2011, the disclosures of each of which are hereby incorporated by reference in their entirety.

TECHNICAL FIELD

The present invention relates to a portable electronic device, a touch operation processing method, and a program.

BACKGROUND ART

In a portable electronic device such as a mobile phone, as a method for switching a mode such as a secret mode, a method in which the portable electronic device displays a mode setting screen in accordance with a user's operation and switches the mode in accordance with the user's operation using the mode setting screen is generally used.

However, in order to perform the mode switching using this method, it is necessary for the user to perform an operation of requesting a display of the mode setting screen and further perform an operation of requesting the mode switching. In this manner, time and effort of a user are necessary and a considerable time is necessary to perform the setting because the user needs to perform a plurality of operations.

Therefore, several methods for more simply performing mode switching have been proposed.

For example, a mobile phone disclosed in Patent Document 1 includes a memory unit which holds input data, a secret mode state holding unit which holds a state of a secret mode, a determination unit which determines whether a secret attribute is assigned to the data, and a control unit which controls an operation of each structural component. When the secret attribute is assigned to the data and the content of the secret mode state holding unit is a normal mode, this control unit switches the content of the secret mode state holding unit to the secret mode and prevents the data to which the secret attribute is assigned from being displayed.

Thereby, in the work of collectively moving data from an old-model mobile phone to a new-model mobile phone when the model of the mobile phone or the like is changed, data set by the user as non-display data in the old-model mobile phone can be easily set as the non-display data even in the new-model mobile phone similar to the old-model mobile phone.

PRIOR ART DOCUMENT

Patent Document

Patent Document 1: Japanese Unexamined Patent Application, First Publication No. 2008-263324

SUMMARY OF INVENTION

Problem to be Solved by the Invention

However, because the mobile phone disclosed in Patent Document 1 determines whether to perform switching to the secret mode based on whether the secret attribute is assigned to the data, the switching to the secret mode may be performed contrary to the user's intention. For example, even when the user assigns the secret attribute to data in advance in preparation for enabling the switching to the secret mode but the user intends to use it usually in the normal mode, the mobile phone disclosed in Patent Document 1 performs the switching to the secret mode.

In addition, with the method shown in Patent Document 1, it is difficult to perform switching to a mode other than the secret mode.

An exemplary object of the present invention is to provide a portable electronic device, a touch operation processing method, and a program capable of solving the above-described problem.

Means for Solving the Problems

The present invention has been made to solve the above-described problem, and a portable electronic device in accordance with an exemplary aspect of the present invention includes: a first touch sensor; a second touch sensor; and a processing unit which performs a first process when the first touch sensor detects a touch operation and perform a second process related to the first process in place of the first process when the first touch sensor detects the touch operation and the second touch sensor detects a touch operation.

In addition, a touch operation processing method in accordance with an exemplary aspect of the present invention is a touch operation processing method of a portable electronic device which includes a first touch sensor and a second touch sensor, and the touch operation processing method includes: performing a first process when the first touch sensor detects a touch operation; and performing a second process related to the first process in place of the first process when the first touch sensor detects the touch operation and the second touch sensor detects a touch operation.

In addition, a program in accordance with an exemplary aspect of the present invention is a program for causing a computer serving as a portable electronic device which includes a first touch sensor and a second touch sensor to execute the processing steps of: performing a first process when the first touch sensor detects a touch operation; and performing a second process related to the first process in place of the first process when the first touch sensor detects the touch operation and the second touch sensor detects a touch operation.

Exemplary Advantage of the Invention

The present invention can reduce time and effort of a user while performing mode switching that reflects the user's intention.

BRIEF DESCRIPTION OF DRAWINGS

FIG. 8 is a descriptive diagram illustrating an example of phone book information stored by a storage unit in the first exemplary embodiment.

FIG. 12 is a descriptive diagram illustrating an example of screen images before and after scrolling in the first exemplary embodiment.

MODES FOR CARRYING OUT THE INVENTION

Hereinafter, an exemplary embodiment of the present invention will be described with reference to the drawings using an example in which the present invention is applied to a portable terminal apparatus. The present invention is applicable to various portable terminal apparatuses such as a mobile phone and a portable information terminal apparatus. However, an application range of the present invention is not limited to the portable terminal apparatuses. For example, the present invention can be applied to various portable information devices such as a stand-alone (i.e., non-terminal type) game machine and an electronic dictionary.

Figure 1:
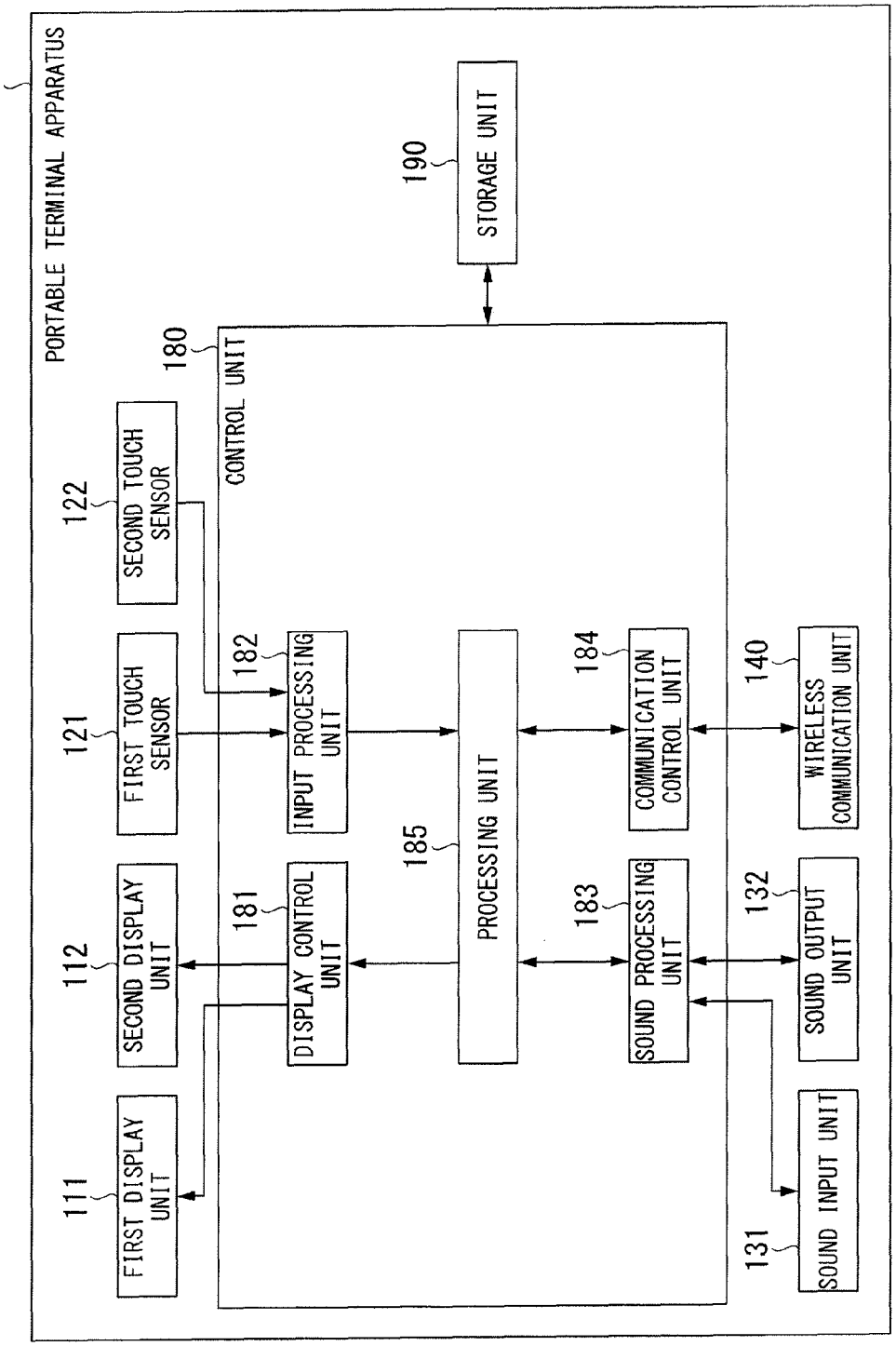
FIG. 1 is a schematic block diagram illustrating a functional configuration of a portable terminal apparatus in a first exemplary embodiment of the present invention.

FIG. 1 is a schematic block diagram illustrating a functional configuration of a portable terminal apparatus in a first exemplary embodiment of the present invention. In FIG. 1, the portable terminal apparatus 100 includes a first display unit 111, a second display unit 112, a first touch sensor 121, a second touch sensor 122, a sound input unit 131, a sound output unit 132, a wireless communication unit 140, a control unit 180, and a storage unit 190. The control unit 180 includes a display control unit 181, an input processing unit 182, a sound processing unit 183, a communication control unit 184, and a processing unit 185.

The portable terminal apparatus 100, for example, is a portable information terminal apparatus and provides various types of functions such as an Internet browsing function and an electronic mail function in accordance with the user's operation.

The first display unit 111, for example, has a display screen such as a liquid crystal display or an organic electro-luminescence (EL) display, and displays various types of images such as a moving image, a still image, and text (characters) in accordance with control of the display control unit 181. The display screen referred to here is a device which displays an image. Hereinafter, in order to distinguish a screen serving as the device which displays the image from a screen serving as an image displayed on the device, the device which displays the image is referred to as a "display screen," and the image displayed on the display screen is referred to as a "screen image."

The first display unit 111 is an example of the display screen in the present invention, and the display screen of the first display unit 111 is an example of the display unit in the present invention.

The second display unit 112, for example, has a display screen such as a liquid crystal display or an organic electro-luminescence (EL) display, and displays various types of images such as a moving image, a still image, and text (characters) in accordance with control of the display control unit 181.

The first touch sensor 121 is provided on the display screen of the first display unit 111 and receives a touch operation of the user. That is, the display screen of the first display unit 111 and the first touch sensor 121 constitute a touch panel.

The first touch sensor 121 detects the touch operation on the display screen of the first display unit 111. Then, the first touch sensor 121 outputs a signal representing a touch position (a position touched on the display screen) to the input processing unit 182.

The second touch sensor 122 is provided on the display screen of the second display unit 112 and receives a touch operation of the user. That is, the display screen of the second display unit 112 and the second touch sensor 122 constitute a touch panel.

Here, the second touch sensor 122 may be a touch sensor of a touchpad provided on a rear surface of a housing of the portable terminal apparatus 100. That is, the portable terminal apparatus 100 may not include the second display unit 112 and thus the display screen may not be provided on the rear surface of the housing; instead, the touchpad may be provided on the rear surface of the housing.

The second touch sensor 122 detects a touch operation on the display screen of the second display unit 112. Then, the second touch sensor 122 outputs a signal representing a touch position to the input processing unit 182.

The sound input unit 131 has a microphone, collects an ambient sound, converts the ambient sound into a sound signal, and outputs the sound signal to the sound processing unit 183.

The sound output unit 132 has a speaker, converts a sound signal output as an analog electrical signal from the sound processing unit 183 into sound, and outputs the sound.

The wireless communication unit 140 communicates with a wireless base station to connect to a mobile phone communication network (a wireless communication network for a mobile phone provided by a communication provider). Specifically, the wireless communication unit 140 performs a modulation process on a signal output from the communication control unit 184, transmits a resultant signal as a wireless signal, performs a demodulation process on a received wireless signal, and outputs a resultant signal to the communication control unit 184. For example, the wireless communication unit 140 transmits and receives electronic mail data as wireless signals.

The control unit 180 controls the units of the portable terminal apparatus 100 to execute various types of functions. In order to implement the control unit 180, for example, a central processing unit (CPU) provided in the portable terminal apparatus 100 reads a program from a memory provided in the portable terminal apparatus 100 and executes the program.

The display control unit 181 controls the first display unit 111 and the second display unit 112 to display various types of images. Specifically, the display control unit 181 generates a signal for displaying a screen based on moving-image data, still-image data, text data, or the like output from the processing unit 185, outputs the signal to the first display unit 111, and causes the first display unit 111 to display a screen image. In addition, likewise, the display control unit 181 generates a signal for displaying a screen, outputs the signal to the second display unit 112, and causes the second display unit 112 to display a screen image.

The input processing unit 182 outputs signals in accordance with operations received by the first touch sensor 121 and the second touch sensor 122 to the processing unit 185.

For example, the input processing unit 182 determines whether an image component has been touched when a signal representing a touch position on the display screen of the first display unit 111 is output from the first touch sensor 121 in a state in which the first display unit 111 displays the image component. Then, the input processing unit 182 outputs information representing the touched image component to the processing unit 185 upon determining that the image component has been touched.

It is to be noted that the image component referred to here is a partial image serving as a component constituting the screen image. For example, an icon, a moving image, or a still image displayed in the screen image, or the like corresponds to an image component. It is to be noted that the icon referred to here is an image which symbolizes something serving as a selection target or a designation target such as a file, a folder, an application program, or a function.

The sound processing unit 183 causes the sound output unit 132 to output sound by converting sound data output from the processing unit 185 into an electrical signal and outputting the electrical signal to the sound output unit 132. In addition, the sound processing unit 183 converts an electrical signal output after the sound input unit 131 has collected sound into sound data and outputs the sound data to the processing unit 185.

The communication control unit 184 performs a process of encoding and the like on data output from the processing unit 185 and outputs resultant data to the wireless communication unit 140 which modulates the resultant data and transmits the modulated data as a wireless signal. In addition, the communication control unit 184 extracts data by performing a process of decoding and the like on a signal received and demodulated by the wireless communication unit 140 and outputs the data to the processing unit 185. For example, the communication control unit 184 performs a process of encoding and the like on electronic mail data output from the processing unit 185 and output resultant data to the wireless communication unit 140, and performs a process of decoding and the like on a signal received and demodulated by the wireless communication unit 140, extracts data such as electronic mail data, and outputs the data to the processing unit 185.

The processing unit 185 provides various functions such as an Internet browsing function and an electronic mail function by executing an application program.

In particular, the processing unit 185 performs a first process when the first touch sensor 121 detects a touch operation and performs a second process related to the first process in place of the first process when the first touch sensor 121 detects the touch operation and the second touch sensor 122 detects a touch operation.

For example, as will be described later with reference to FIGS. 6 and 7, when an image component is included in the screen image displayed by the first display unit 111, the processing unit 185 performs a process of varying the position of the image component in the screen image as the first process if the first touch sensor 121 detects an operation of varying the position of the image component as the touch operation. In addition, when an image component is included in the screen image, the processing unit 185 performs a process of scrolling the screen image as the second process if the first touch sensor 121 detects a touch operation serving as the operation of varying the position of the image component and the second touch sensor 122 detects a touch operation.

In addition, as will be described later with reference to FIGS. 8 to 11, when the first touch sensor 121 detects a touch operation serving as a user authentication request operation, the processing unit 185 performs user authentication and performs a process of permitting access to first data from a predetermined program as the first process if the authentication is successful. In addition, when the first touch sensor 121 detects the touch operation serving as the user authentication request operation and the second touch sensor 122 detects a touch operation, the processing unit 185 performs the user authentication and performs a process of permitting access to second data from the predetermined program as the second process if the authentication is successful.

In addition, as will be described with reference to FIGS. 12 and 13, the processing unit 185 performs a process of scrolling a screen image by a set scrolling amount as the first process when the first touch sensor 121 detects a touch operation serving as a scrolling operation. In addition, the processing unit 185 performs a process of changing a setting of the scrolling amount as the second process when the first touch sensor 121 detects the touch operation serving as the scrolling operation and the second touch sensor 122 detects a touch operation, and performs a process of scrolling the screen image by the scrolling amount set in the second process as the first process.

In addition, the processing unit 185 performs the first process when the first touch sensor 121 detects the touch operation and performs a third process in place of the second process or in addition to the second process when the first touch sensor 121 detects the touch operation, the second touch sensor 122 detects the touch operation, and at least one of the first touch sensor 121 and the second touch sensor 122 detects touch operations at a plurality of positions.

The storage unit 190, for example, is implemented by a storage region of a memory provided in the portable terminal apparatus 100, and stores various types of data. In particular, the storage unit 190 stores phone book information. This phone book information will be described later with reference to FIG. 8. In addition, the storage unit 190 stores various types of programs to be executed by the CPU provided in the portable terminal apparatus 100 in advance.

Figure 2:
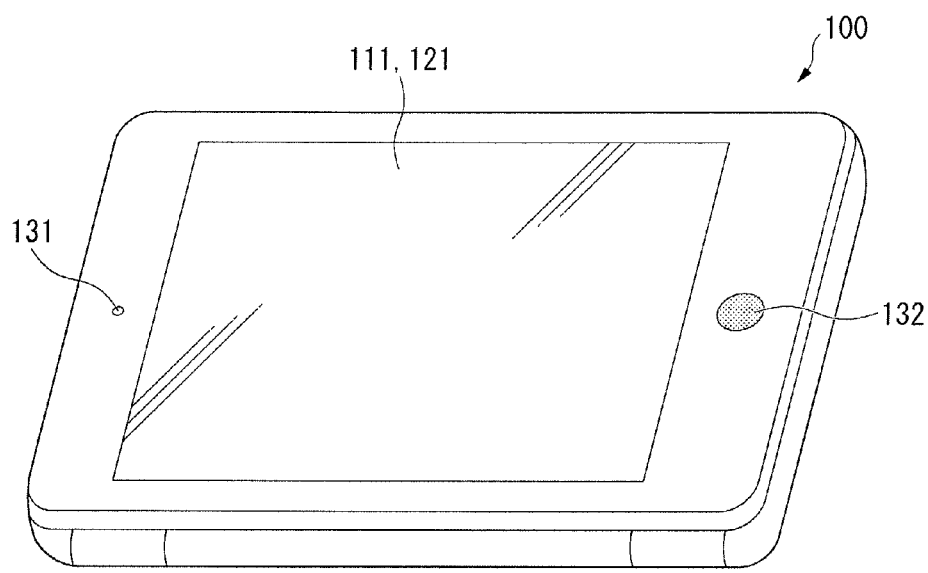
FIG. 2 is a perspective view illustrating an outline of an external appearance of the portable terminal apparatus in the first exemplary embodiment viewed from a front surface.

FIG. 2 is a perspective view illustrating an outline of an external appearance of the portable terminal apparatus 100 viewed from a front surface. In FIG. 2, a touch panel type display screen corresponding to the display screen of the first display unit 111 and the first touch sensor 121, a microphone of the sound input unit 131, and a speaker of the sound output unit 132 are provided on a front surface of a housing of the portable terminal apparatus 100.

Figure 3:
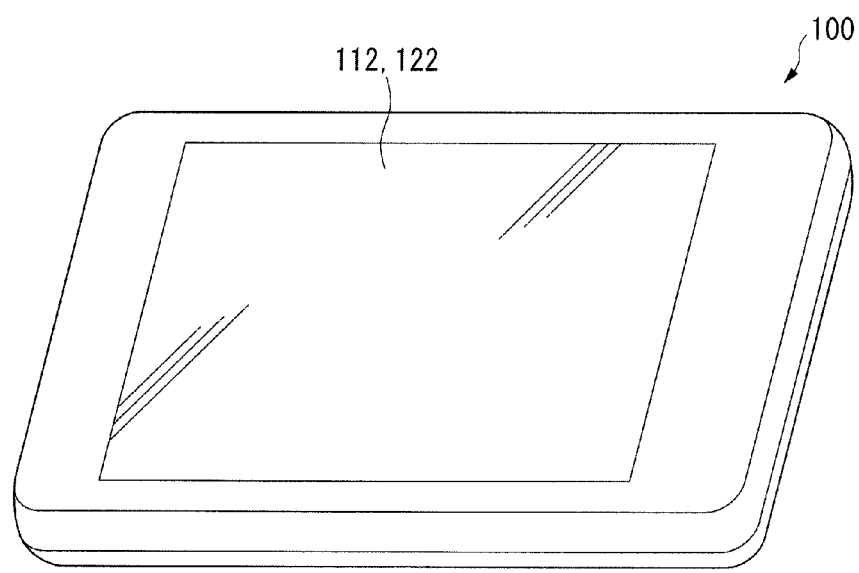
FIG. 3 is a perspective view illustrating an outline of the external appearance of the portable terminal apparatus in the first exemplary embodiment viewed from a back surface.

FIG. 3 is a perspective view illustrating an outline of the external appearance of the portable terminal apparatus 100 viewed from a back surface. In FIG. 3, a touch panel type display screen corresponding to the display screen of the second display unit 112 and the second touch sensor 122 is provided on the back surface of the housing of the portable terminal apparatus 100.

Next, the touch operations on the display screen of the first display unit 111 and the display screen of the second display unit 112 will be described with reference to FIGS. 4 and 5.

Figure 4:
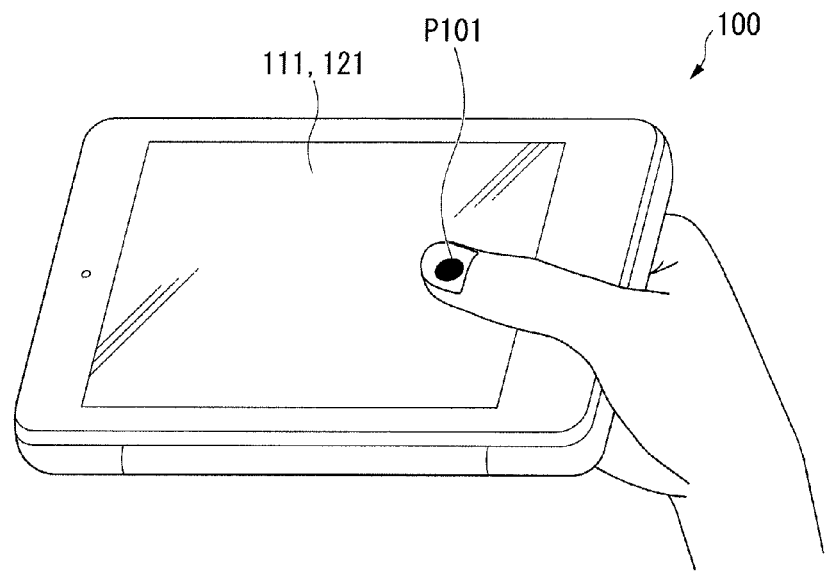
FIG. 4 is a perspective view of a state in which the portable terminal apparatus in the first exemplary embodiment is held with one's right hand viewed from the front surface of the portable terminal apparatus.

FIG. 4 is a perspective view of a state in which the portable terminal apparatus 100 is held with one's right hand viewed from the front surface of the portable terminal apparatus 100.

For example, when the user touches a point P101 of the display screen of the first display unit 111 with the thumb of one's right hand, the first touch sensor 121 detects the touch operation and outputs coordinates of the point P101 as a touch position.

It is to be noted that with respect to the point P101, a region having a small area is referred to as a "point." For example, the first touch sensor 121 has mesh-shaped detection points and outputs coordinates of a detection point included in the point P101 serving as the region among these detection points. A point P102 and the second touch sensor 122 to be described in the following are also similar.

Figure 5:
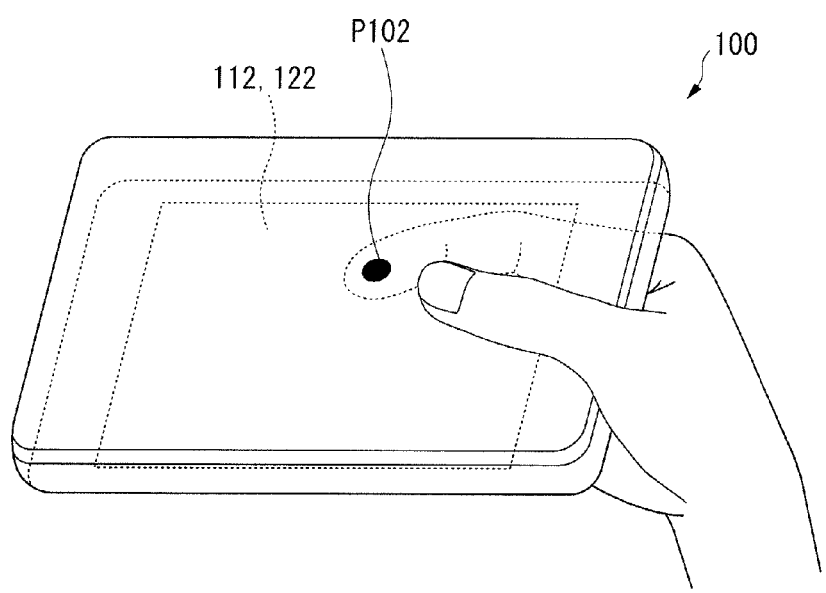
FIG. 5 is a transparent view of a rear surface of the portable terminal apparatus of the first exemplary embodiment viewed from the front surface of the portable terminal apparatus in the state in which the portable terminal apparatus is held with one's right hand.

FIG. 5 is a transparent view of the rear surface of the portable terminal apparatus 100 viewed from the front surface of the portable terminal apparatus 100 in a state in which the portable terminal apparatus 100 is held with one's right hand.

For example, when the user touches the point P102 of the display screen of the second display unit 112 with the index finger of one's right hand, the second touch sensor 122 detects the touch operation and outputs coordinates of the point P102 as a touch position.

In this manner, the user can touch the display screen of the first display unit 111 and the display screen of the second display unit 112 by pinching and holding the portable terminal apparatus 100 with one hand and the first touch sensor 121 and the second touch sensor 122 detect these touch operations. It is to be noted that the point P101 of FIG. 4 and the point P102 of FIG. 5 may be positions opposite to each other or may be shifted.

However, the first touch sensor 121 and the second touch sensor 122 can detect the touch operations on the display screen of the first display unit 111 and the display screen of the second display unit 112 performed in various forms as well as the above-described touch operations.

For example, the user can hold the portable terminal apparatus 100 with one's left hand, perform the touch operation on the display screen of the first display unit 111 with the index finger of one's right hand, and perform the touch operation on the display screen of the second display unit 112 with the index finger of one's left hand. In this case, the first touch sensor 121 and the second touch sensor 122 also detect these touch operations.

Alternatively, the housings of the portable terminal apparatus 100 may be foldable, and the display screen of the first display unit 111 and the display screen of the second display unit 112 may be disposed on the front surface so as to be arranged up and down in a state in which the housings are opened. In this case, the user can perform the touch operation on the display screen of the first display unit 111 with the index finger of one's right hand and perform the touch operation on the display screen of the second display unit 112 with the thumb of one's left hand while holding the portable terminal apparatus 100 with one's left hand. In this case, the first touch sensor 121 and the second touch sensor 122 also detect these touch operations.

Next, a processing mode of the portable terminal apparatus 100 will be described with reference to FIGS. 6 to 13. The processing mode referred to here is a mode representing whether to perform one of a plurality of processes (first and second processes) related to each other.

First, the case in which the first process is a process of varying the position of the image component in the screen image and the second process is the scrolling of the screen image will be described with reference to FIGS. 6 and 7.

Figure 6:
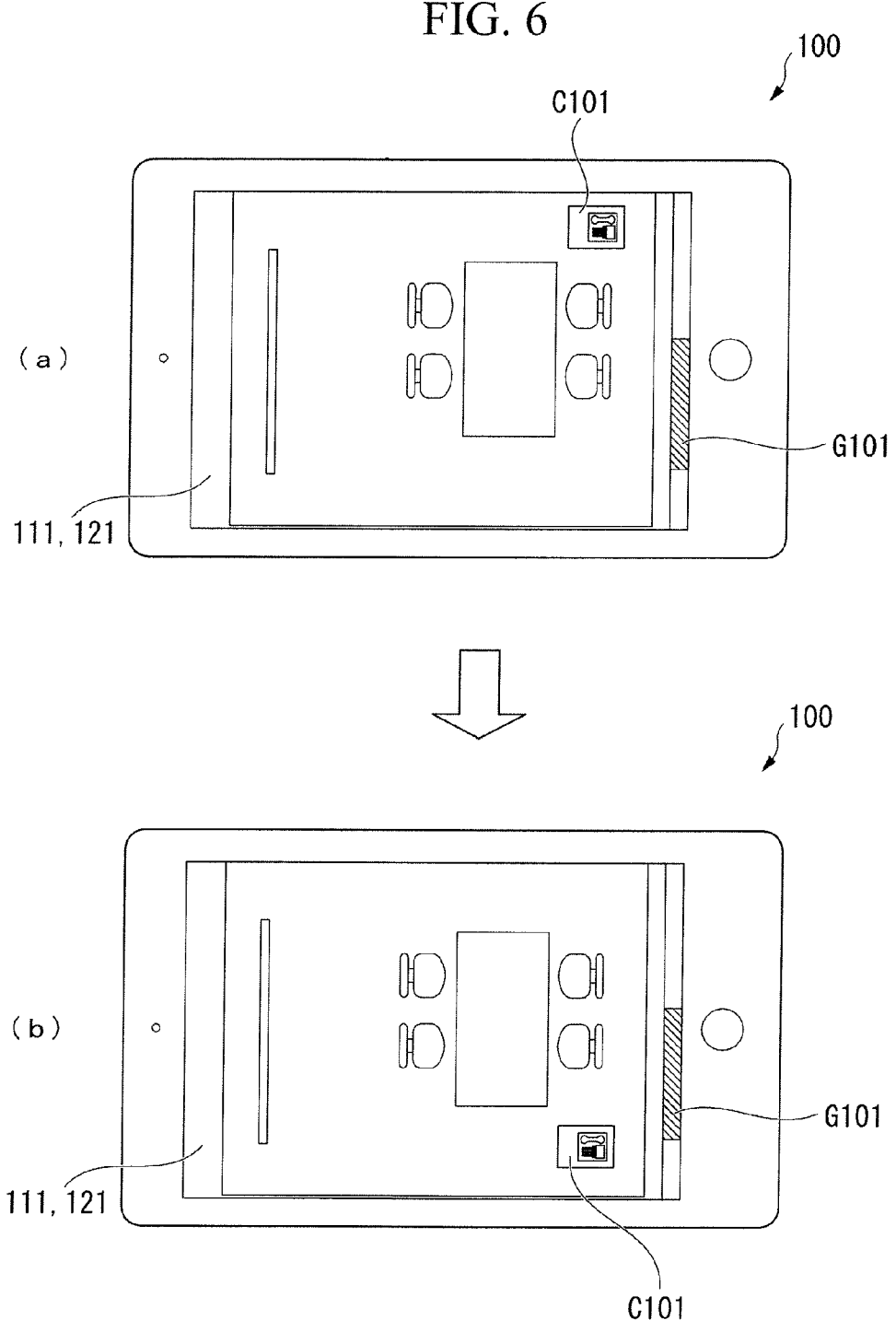
FIG. 6 is a descriptive diagram illustrating an example of a screen image when a position of an image component is varied in the first exemplary embodiment.

FIG. 6 is a descriptive diagram illustrating an example of a screen image when a position of an image component is varied. FIG. 6(a) illustrates the screen image of the first display unit 111 before the position of the image component is varied, and FIG. 6(b) illustrates the screen image of the first display unit 111 after the position of the image component is varied.

On the screen image of FIG. 6(a), an icon C101 which is an example of the image component and a slide bar G101 representing a scrolling position of the screen image (a position of the screen image in the overall image to be displayed) are shown.

In addition, when the screen image of FIG. 6(b) is compared to the screen image of FIG. 6(a), the position of the icon C101 in the screen image is varied. In contrast, the scrolling position of the screen image in FIG. 6(b) is the same as the scrolling position in FIG. 6(a). Thus, while a display position of the icon C101 is varied, the position of the slide bar G101 in FIG. 6(b) is the same as the position of the slide bar G101 in FIG. 6(a).

The processing unit 185 performs the process of FIG. 6 when the first touch sensor 121 detects a touch operation serving as an operation of varying the position of the image component C101 and the second touch sensor 122 does not detect a touch operation.

More specifically, when drag and drop of the image component C101 are performed as the operation of varying the position of the image component C101, the first touch sensor 121 detects touch positions sequentially (i.e., at predetermined time intervals) and the input processing unit 182 sequentially outputs information representing that the image component C101 has been dragged and dropped and information representing the touch positions to the processing unit 185. Then, the processing unit 185 sequentially outputs indications of the positions of the image component C101 within the screen image based on the information output from the input processing unit 182 to the display control unit 181. Then, the display control unit 181 sequentially varies the position of the image component C101 within the screen image of the first display unit 111 in accordance with the indications output from the processing unit 185.

Here, it is possible to use various operations as the operation of varying the position of the image component C101. For example, as described above, it is possible to use an operation of dragging and dropping the image component C101, that is, an operation of touching the image component C101 in the screen image of FIG. 6(a) with a finger, moving one's finger to the position (the position at which the user desires to move) of the image component C101 in the screen image of FIG. 6(b) while touching the display screen with one's finger, and separating one's finger from the display screen. Alternatively, an operation other than the drag and drop such as an operation of flicking the image component, that is, an operation of touching the image component C101 in the screen image of FIG. 6(a) with a finger and rubbing the display screen with one's finger toward the position of the image component C101 in the screen image of FIG. 6(b) (in a direction in which the user desires to move) as if flicking the image component C101 with one's finger, may be used.

Figure 7:
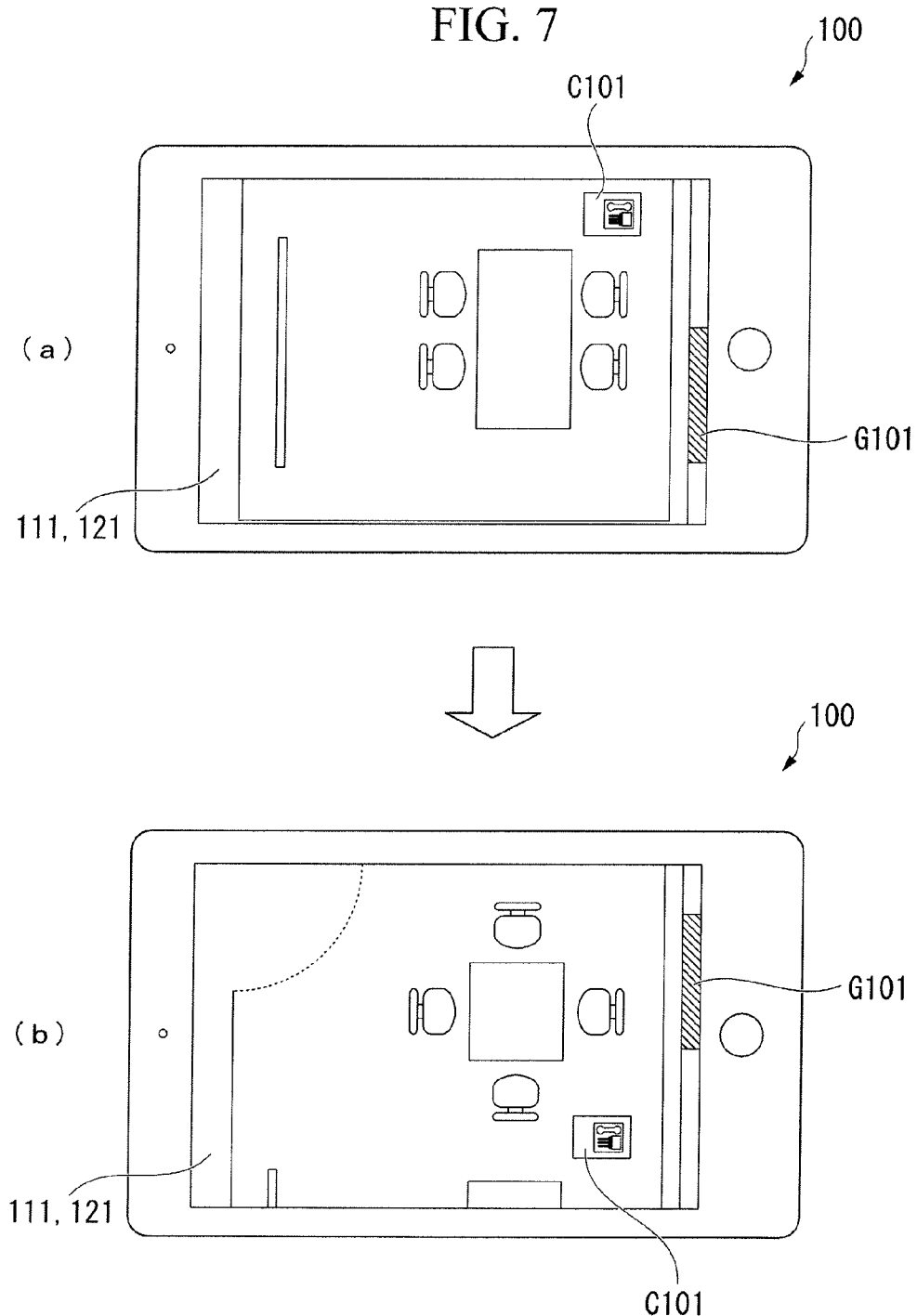
FIG. 7 is a descriptive diagram illustrating an example of a screen image when the screen image is scrolled in the first exemplary embodiment.

FIG. 7 is a descriptive diagram illustrating an example of a screen image when a screen image is scrolled.

Like the case of FIG. 6(a), the screen image of FIG. 7(a) shows an icon C101 which is an example of an image component and a slide bar G101 representing a scrolling position of the screen image.

In addition, in the screen image of FIG. 7(b), as in the case of FIG. 6(b), a display position of the icon C101 varies. However, in the screen image in FIG. 7(b), the scrolling position also varies from the scrolling position in FIG. 7(a); in this point, FIG. 7(b) is different from the case of FIG. 6(b). Thus, the position of the slide bar G101 in FIG. 7(b) varies from the position of the slide bar in FIG. 7(a).

That is, the movement process of the icon illustrated in FIG. 6 and the scrolling process illustrated in FIG. 7 are related to each other in that they move the display position of the icon. On the other hand, the movement process of the icon illustrated in FIG. 6 and the scrolling process illustrated in FIG. 7 are different in whether only the icon is moved or the overall image displayed by the display screen is moved.

The processing unit 185 performs the process of FIG. 7 when the first touch sensor 121 detects a touch operation serving as an operation of varying the position of the image component C101 and the second touch sensor 122 detects a touch operation.

More specifically, when drag and drop of the image component C101 is performed, the first touch sensor 121 detects touch positions sequentially and the input processing unit 182 sequentially outputs information representing that the image component C101 has been dragged and dropped and information representing the touch positions to the processing unit 185. In addition, while the drag and drop of the image component C101 are performed, the display screen of the second display unit 112 is touched, the second touch sensor 122 sequentially detects the touch positions, and the input processing unit 182 sequentially outputs information representing the touch positions to the processing unit 185.

Then, the processing unit 185 sequentially outputs indications (information representing positions of portions displayed as the screen image in an image to be displayed) indicating that the screen image is to be scrolled to the display control unit 181 based on the information output from the input processing unit 182. Then, the display control unit 181 scrolls the screen image of the first display unit 111 in accordance with the indications output from the processing unit 185.

Here, the process in FIG. 6 and the process in FIG. 7 are examples of two processing modes in the process of varying the position of the image component C101. That is, the process in FIG. 6 and the process in FIG. 7 have a common feature (are related to each other) in that the process of varying the display position of the image component C101 is performed and they are different from in whether only the image component C101 is moved or the overall image displayed by the display screen is moved. In this case, the process of varying the display position of the image component C101 corresponds to the first process and the process of scrolling the screen image corresponds to the second process.

Next, the case in which the first process is a process of permitting access to first data from a predetermined program and the second process is a process of permitting access to second data from the predetermined program will be described with reference to FIGS. 8 to 11.

FIG. 8 is a descriptive diagram illustrating an example of phone book information stored by the storage unit 190. This phone book information includes information about a name, a phone number, and the like displayed by a phone book display function of the portable terminal apparatus 100. In addition, when the portable terminal apparatus 100 displays information about an incoming call history and the like, the phone book information is used as information for replacing a phone number with a name and displaying the name.

As illustrated in FIG. 8, the phone book information has a data structure of a table format, and each row corresponds to data for one person. For example, data of Mr. or Ms. A, Mr. or Ms. B, and Mr. or Ms. C is stored in rows L201, L202, and L203, respectively.

The phone book information includes a secret flag which is a flag representing presence/absence of secret designation in addition to data such as the name and the phone number. A value "YES" of this secret flag represents secret designation. In contrast, a value "NO" of the secret flag represents that there is no secret designation. For example, in the row L202, the data of Mr. or Ms. B is designated as secret. In contrast, in the rows L201 and L203, the data of Mr. or Ms. A and Mr. or Ms. C is not designated as secret. The presence/absence of the secret designation is set by the user.

Figure 9:
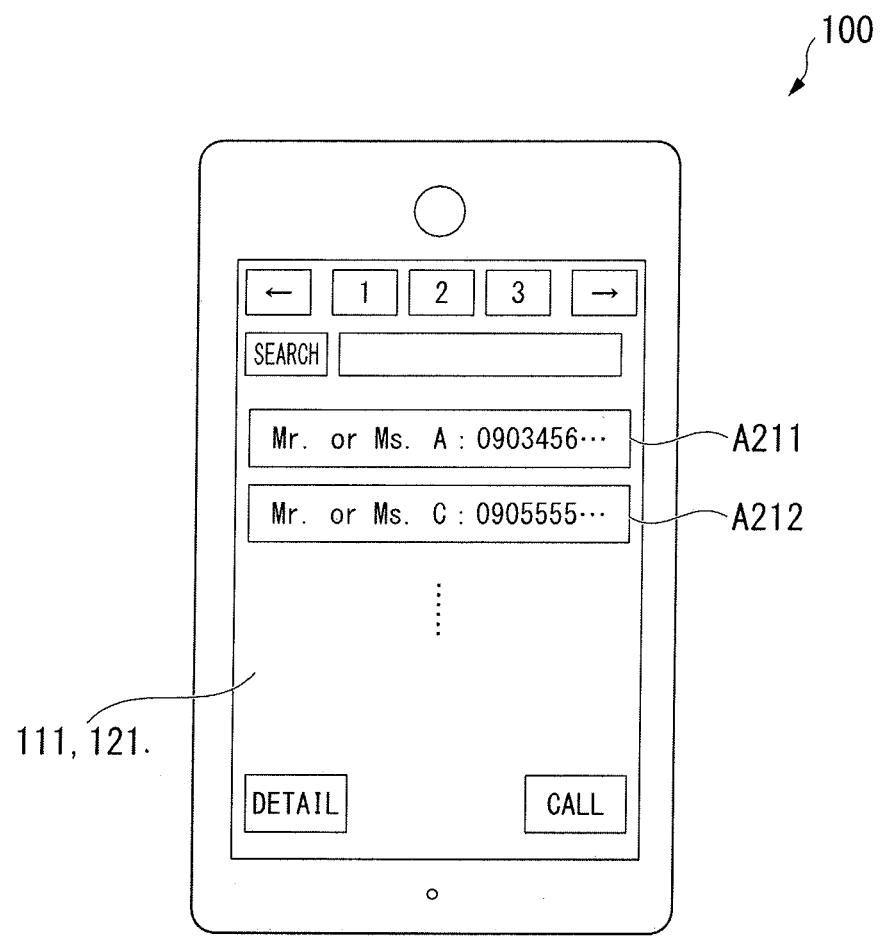
FIG. 9 is a descriptive diagram illustrating an example of a display image when the portable terminal apparatus executes a phone book display function in a normal mode in the first exemplary embodiment.

FIG. 9 is a descriptive diagram illustrating an example of a display image when the portable terminal apparatus 100 executes the phone book display function in a normal mode.

The normal mode is a mode for restricting access to data designated as secret from an application program and permitting access to data not designated as secret from the application program.

The processing unit 185 which executes an application program of a phone book display causes the first display unit 111 to display data for which access is permitted in accordance with the access restriction.

In the example of FIG. 9, access from the application program of the phone book display to the data of Mr. or Ms. A and the data of Mr. or Ms. C that is not designated as secret in FIG. 8 is permitted, and the data of Mr. or Ms. A and the data of Mr. or Ms. C are displayed on regions A211 and A212, respectively.

In contrast, access from the application program of the phone book display to the data of Mr. or Ms. B that is designated as secret in FIG. 8 is restricted. Thus, the data of Mr. or Ms. B is not displayed on the screen image of FIG. 9.

Figure 10:
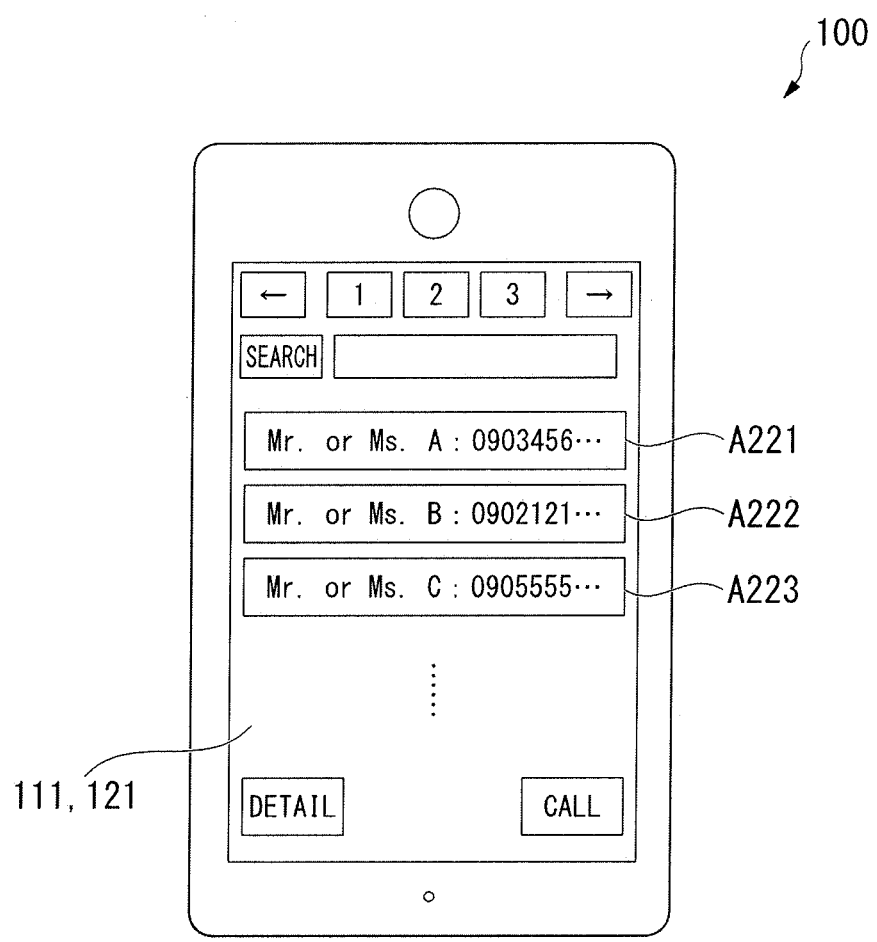
FIG. 10 is a descriptive diagram illustrating an example of a display screen when the portable terminal apparatus executes the phone book display function in a secret mode in the first exemplary embodiment.

FIG. 10 is a descriptive diagram illustrating an example of a display screen when the portable terminal apparatus 100 executes the phone book display function in the secret mode.

The secret mode is a mode for permitting both access from an application program to data designated as secret and access from the application program to data not designated as secret.

Accordingly, the processing unit 185 which executes the application program of the phone book display causes the first display unit 111 to display both of data designated as secret and data not designated as secret.

In the example of FIG. 10, both of access from the application program of the phone book display to the data of Mr. or Ms. A and the data of Mr. or Ms. C that is not designated as secret in FIG. 8 and access from the application program of the phone book display to the data of Mr. or Ms. B that is designated as secret in FIG. 8 are permitted. Then, the data of Mr. or Ms. A, the data of Mr. or Ms. B, and the data of Mr. or Ms. C are displayed on regions A221, A222, and A223, respectively.

Figure 11:
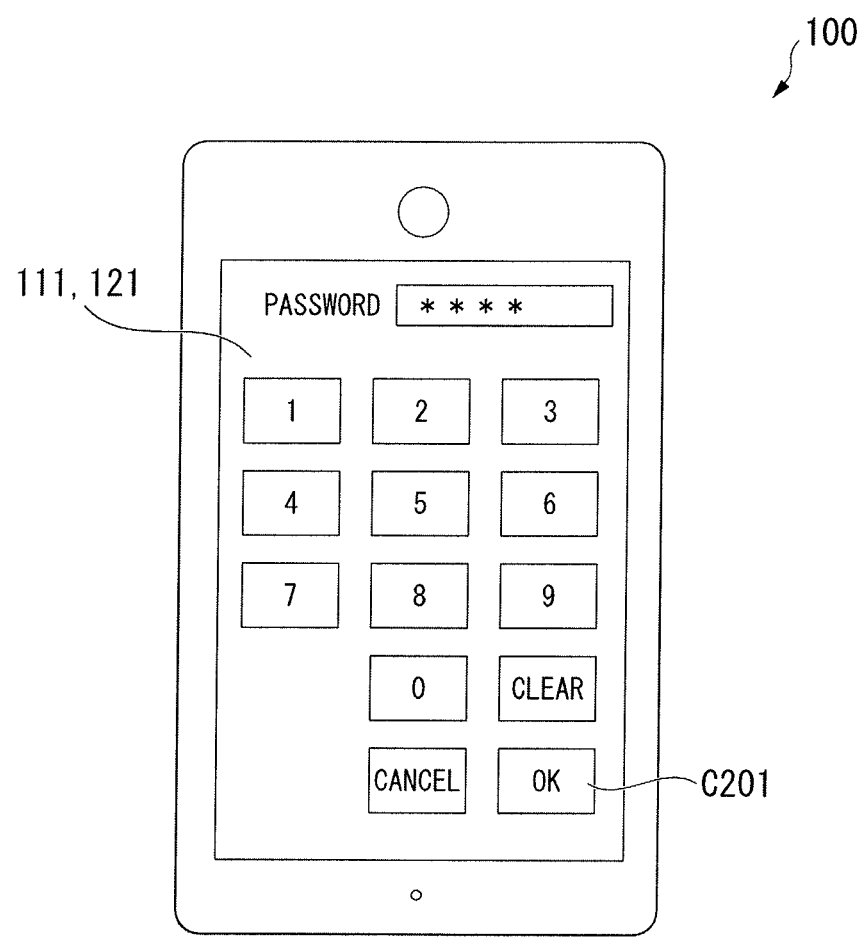
FIG. 11 is a descriptive diagram illustrating an example of a user authentication screen displayed by a first display unit in the first exemplary embodiment.

FIG. 11 is a descriptive diagram illustrating an example of a user authentication screen (a screen image when user authentication is performed) displayed by the first display unit 111.

Here, the user of the portable terminal apparatus 100 sets in advance whether to perform user authentication when the portable terminal apparatus 100 is used, and the storage unit 190 stores setting content in advance. Then, when a setting to perform the user authentication is set, the portable terminal apparatus 100 receives an input of a password by causing the first display unit 111 to display a user authentication screen when a power source is connected (ON) to the portable terminal apparatus 100 and the portable terminal apparatus 100 is started up or when the portable terminal apparatus 100 is reused after the portable terminal apparatus 100 entered a sleep mode without being used for a fixed time (e.g., for 10 minutes).

In a state in which the first display unit 111 displays the user authentication screen of FIG. 11, when a password input operation is performed as a result of touch operations of icons of push buttons such as "0" to "9" (operations of pressing push buttons), the input processing unit 182 detects the touched icons. Then, the processing unit 185 detects the input password based on the detected icons.

Thereafter, when a touch operation on an icon C201 of an "OK" push button (hereinafter referred to as an "OK icon" C201) is performed, the processing unit 185 performs user authentication by determining whether the input password is the same as a password stored by the storage unit 190 in advance.

If the user authentication has succeeded, that is, if the input password is determined to be the same as the password stored by the storage unit 190 in advance, the processing unit 185 transitions to an execution mode and executes various types of functions such as the above-described phone book display function in accordance with the user's operation.

The execution mode includes the normal mode and the secret mode described above, and the processing unit 185 transitions to one of the modes depending on whether the second touch sensor 122 has detected the touch operation when the user authentication has succeeded. Specifically, if the second touch sensor 122 detects the touch operation on the display screen of the second display unit 112 when the first touch sensor 121 has detected the touch operation on the OK icon C201, the processing unit 185 transitions to the secret mode; if the second touch sensor 122 does not detect the touch operation on the display screen of the second display unit 112, the processing unit 185 transitions to the normal mode.

In contrast, if the user authentication has failed, that is, if the input password is determined to be different from the password stored by the storage unit 190 in advance, the processing unit 185 transitions to the sleep mode and waits for a password to be input again.

Here, the transition to the normal mode and the transition to the secret mode are examples of two processing modes when the processing unit 185 executes various types of functions. That is, the transition to the normal mode and the transition to the secret mode have a common feature in that a process of permitting access to data not set as secret from application programs of those functions is performed through a setting process to receive an execution request of various types of functions. In contrast, the transition to the normal mode and the transition to the secret mode are different in whether a process (setting) of permitting access to data set as secret is performed.

In this case, data not set as secret corresponds to first data and data including both of data not set as secret and data set as secret correspond to second data. In addition, a process of permitting access to the first data from the application program corresponds to a first process and a process of permitting access to the second data from the application program corresponds to a second process.

These first and second processes have a common feature (are related to each other) in that access to data from the application program is permitted and they are different in data for which access is permitted.

Next, the case in which the first process is a process of scrolling the screen image by a set scrolling amount and the second process is a process of changing a setting of the scrolling amount will be described with reference to FIGS. 12 and 13.

FIG. 12 is a descriptive diagram illustrating an example of screen images before and after scrolling. In FIG. 12, the display screen of the first display unit 111 displays a web page and a slide bar G301 representing a scrolling position is displayed on the right of the display screen. Here, FIG. 12(a) illustrates the screen image of the first display unit 111 before the scrolling, and FIG. 12(b) illustrates the screen image of the first display unit 111 after the scrolling.

Although FIGS. 12(a) and 12(b) illustrate the screen images when the first display unit 111 displays the same web page, scrolling positions (positions of screen images within the web page to be displayed) are different from each other. FIG. 12(b) illustrates a screen image scrolled down by a scrolling amount corresponding to one display screen from the scrolling position in FIG. 12(a). Thus, the position of the slide bar G301 in FIG. 12(b) becomes a position moved down from the position of the slide bar G301 in FIG. 12(a) in accordance with the scrolling amount.

The processing unit 185 performs the process of FIG. 12 when the first touch sensor 121 detects the touch operation serving as the scrolling operation and the second touch sensor 122 does not detect the touch operation.

More specifically, when a touch operation (tap) on a region A301 below the slide bar G301 is performed as the scrolling operation, the first touch sensor 121 detects a touch position and the input processing unit 182 outputs information representing that the touch operation on the region A301 has been performed and information representing the touch position to the processing unit 185. Then, the processing unit 185 outputs an indication indicating that the scrolling position of the screen image is to be moved down by a scrolling amount corresponding to one display screen to the display control unit 181 based on the information output from the input processing unit 182. Then, the display control unit 181 moves the scrolling position of the screen image of the first display unit 111 down by the scrolling amount corresponding to the one display screen in accordance with the indication output from the processing unit 185.

Here, various operations can be used as the scrolling operation. For example, as described above, an operation of tapping a region above or below the slide bar G301 can be used. Alternatively, the first display unit 111 may display an icon of a scroll-up button and an icon of a scroll-down button and use touch operations of these icons as scrolling operations.

Figure 13:
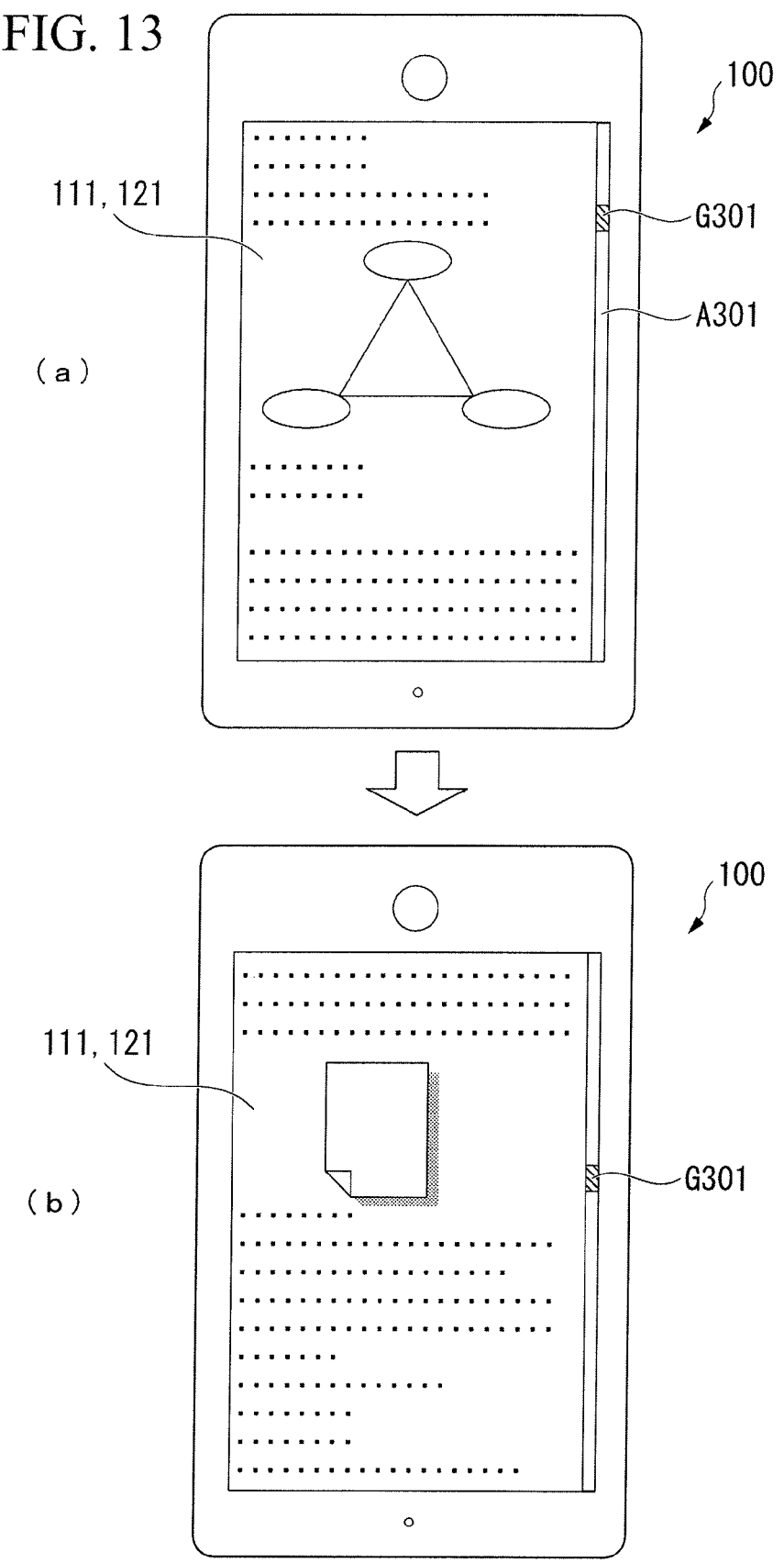
FIG. 13 is a descriptive diagram illustrating another example of screen images before and after the scrolling in the first exemplary embodiment.

FIG. 13 is a descriptive diagram illustrating another example of screen images before and after scrolling. As in the case of FIG. 12, in FIG. 13, the display screen of the first display unit 111 displays a web page and the slide bar G301 representing the scrolling position is displayed on the right of the display screen. Here, FIG. 13(a) illustrates the screen image of the first display unit 111 before the scrolling and FIG. 13(b) illustrates the screen image of the first display unit 111 after the scrolling.

In addition, FIG. 13(a) and FIG. 13(b) are similar to the case of FIG. 12 in that the screen image when the first display unit 111 displays the same web page is illustrated and that the scrolling positions (the positions of the screen images within the web page to be displayed) are different from each other.

However, in FIG. 13, the scrolling amount is different from the case of FIG. 12. FIG. 13(b) illustrates the screen image scrolled down by a scrolling amount corresponding to five display screens from the scrolling position in FIG. 13(a). For this reason, the position of the slide bar G301 in FIG. 13(b) becomes a position moved down from the position of the slide bar G301 in FIG. 13(a) in accordance with the scrolling amount. In addition, since the scrolling amount in FIG. 13 is larger than in the case of FIG. 12, the downward movement amount of the slide bar G301 also becomes larger.

The processing unit 185 performs the process of FIG. 13 when the first touch sensor 121 detects the touch operation serving as the scrolling operation and the second touch sensor 122 detects the touch operation.

More specifically, when a touch operation (tap) on the region A301 below the slide bar G301 is performed as the scrolling operation, the first touch sensor 121 detects a touch position and the input processing unit 182 outputs information representing that the touch operation on the region A301 has been performed and information representing the touch position to the processing unit 185. In addition, when the touch operation on the region A301 has been performed, the display screen of the second display unit 112 is touched, the second touch sensor 122 detects a touch position, and the input processing unit 182 outputs the information representing the touch position to the processing unit 185.

Then, the processing unit 185 outputs an indication indicating that the scrolling position of the screen image is to be moved down by a scrolling amount corresponding to five display screens to the display control unit 181 based on the information output from the input processing unit 182. Then, the display control unit 181 moves the scrolling position of the screen image of the first display unit 111 down by the scrolling amount corresponding to the five display screens in accordance with the indication output from the processing unit 185.

Here, the process in FIG. 12 and the process in FIG. 13 are examples of two processing modes in the process of scrolling the screen image of the first display unit 111. That is, the process in FIG. 12 and the process in FIG. 13 have a common feature (are related to each other) in that the process of scrolling the screen image of the first display unit 111 is performed and they are different in the scrolling amount. In addition, the process (the process in FIG. 12) of scrolling the screen image of the first display unit 111 down by a scrolling amount corresponding to one display screen corresponds to the first process and the process (the process in FIG. 13) of scrolling the screen image of the first display unit 111 down by a scrolling amount corresponding to five display screens as a scrolling amount different from that of the first process corresponds to the second process.

Next, an operation of the portable terminal apparatus 100 will be described with reference to FIG. 14.

Figure 14:
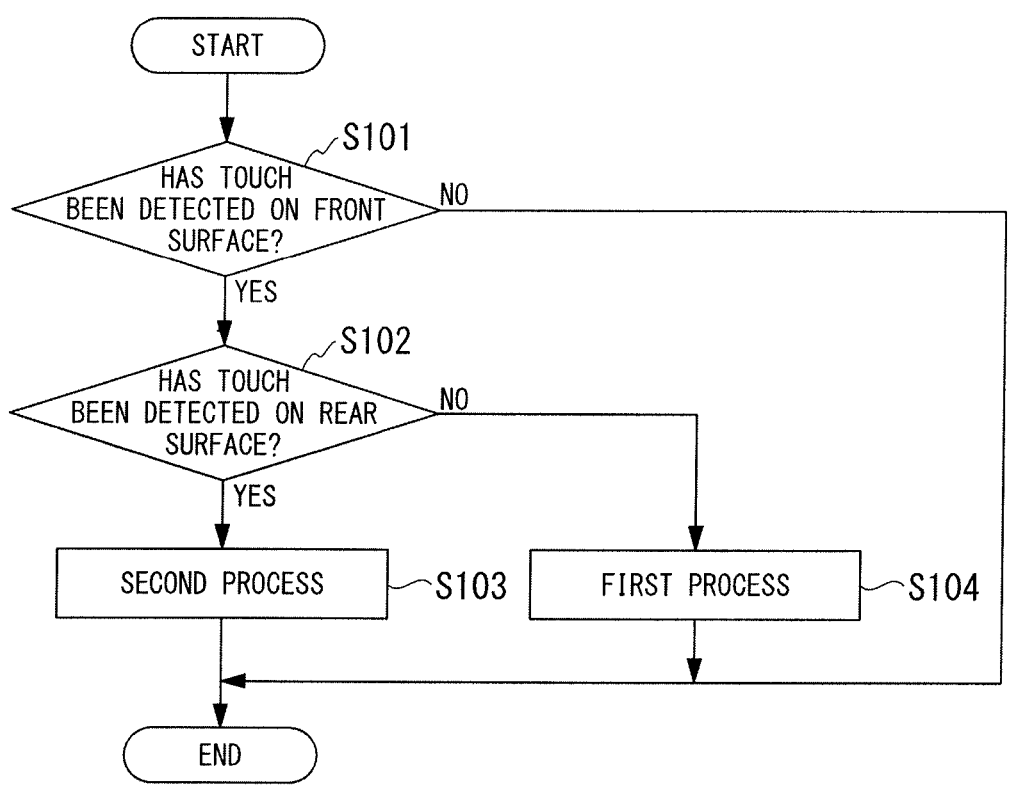
FIG. 14 is a flowchart illustrating a processing procedure when the portable terminal apparatus selects and executes a processing mode in the first exemplary embodiment.

FIG. 14 is a flowchart illustrating a processing procedure when the portable terminal apparatus 100 selects and executes a processing mode.

In the process of FIG. 14, first, the processing unit 185 determines whether the first touch sensor 121 has detected a predetermined touch operation on the display screen of the first display unit 111 (step S101). If it is determined that the first touch sensor 121 has not detected the predetermined touch operation (step S101: NO), the process of FIG. 14 ends.

In contrast, upon determining that the predetermined touch operation has been detected on the display screen of the first display unit 111 (step S101: YES), the processing unit 185 determines whether the second touch sensor 122 has detected a touch operation on the display screen of the second display unit 112 (step S102). Upon determining that the second touch sensor 122 has detected the touch operation on the display screen of the second display unit 112 (step S102: YES), the processing unit 185 performs the second process (step S103). Thereafter, the process of FIG. 14 ends.

In contrast, upon determining that the second touch sensor 122 has not detected the touch operation on the display screen of the second display unit 112 in step S102 (step S102: NO), the processing unit 185 performs the first process (step S104). Thereafter, the process of FIG. 14 ends.

As described above, the processing unit 185 determines whether to perform the first process or the second process based on whether the second touch sensor 122 has detected the touch operation when the first process in accordance with the touch operation detected by the first touch sensor 121 is performed. That is, the processing unit 185 selects a mode in which a process is performed based on whether the second touch sensor 122 has detected the touch operation.

In this manner, the processing unit 185 can perform mode switching that reflects the user's intention because the mode is selected in accordance with presence/absence of the touch operation of the user. In addition, it is possible to reduce time and effort of the user because the user can select the mode (indicate the mode to the portable terminal apparatus 100) in accordance with the presence/absence of a simple operation of touching the display screen of the second display unit 112.

In addition, when the display position of the image component in the screen image of the first display unit 111 is varied in accordance with the user's touch operation, the processing unit 185 determines whether to scroll the screen image of the first display unit 111 based on whether the second touch sensor 122 has detected the touch operation.

Accordingly, the user can select whether to vary the position of the component image in the screen image or scroll the screen image depending on presence/absence of a simple operation of touching the display screen of the second display unit 112. That is, the user does not need to separately set whether to move only the component image or to scroll the screen image.

In addition, the processing unit 185 determines whether to permit access to data set as secret (i.e., whether to set the mode to the normal mode or the secret mode) based on whether the second touch sensor 122 has detected the touch operation when a process of permitting access to data from an application program is performed in accordance with the user's touch operation.

Accordingly, the user may select either the normal mode or the secret mode depending on presence/absence of a simple operation of touching the display screen of the second display unit 112. In particular, the user does not need to separately perform the mode setting.

In addition, the processing unit 185 determines whether to vary the scrolling amount based on whether the second touch sensor 122 has detected the touch operation when the screen image of the first display unit 111 is scrolled in accordance with the user's touch operation.

Accordingly, the user can vary the scrolling amount depending on presence/absence of a simple operation of touching the display screen of the second display unit 112. In particular, the user does not need to separately perform the setting of the scrolling amount.

It is to be noted that although the case in which the processing unit 185 determines whether to perform the first process or the second process based on whether the second touch sensor 122 has detected the touch operation has been described above, the number of processes to be selected by the processing unit 185 may be three or more. That is, in accordance with the number of positions of touches detected by the first touch sensor 121 and/or the second touch sensor 122, the processing unit 185 may selectively perform two or more processes such that the processing unit 185 determines whether to perform the third process in place of the second process or to perform the third process in addition to the second process.

For example, when touch operations at two positions using the index finger and the middle finger on the display screen of the second display unit 112 are performed in the scrolling of the screen image of the first touch sensor 121 described with reference to FIGS. 12 and 13, the second touch sensor 122 detects the touches at the positions and outputs information representing the touch positions to the input processing unit 182. Then, the input processing unit 182 outputs information representing that the touches at the two positions have been performed and information representing the touch positions to the processing unit 185 based on the touch positions output from the second touch sensor 122. In accordance with the information output from the input processing unit 182, the processing unit 185 performs a process (third process) of scrolling the screen image by a scrolling amount corresponding to ten display screens in place of the process (second process) of scrolling the screen image by a scrolling amount corresponding to five display screens.

In this manner, the processing unit 185 selects and executes any one of a plurality of processes in accordance with the number of positions of touches detected by the first touch sensor 121 and/or the second touch sensor 122. That is, the processing unit 185 selects any one of three or more processing modes in accordance with the number of positions of touches detected by the first touch sensor 121 and/or the second touch sensor 122.

Accordingly, the user can select any one of three or more processing modes using a simple operation of varying the number of fingers to touch the display screen of the first display unit 111 and/or the display screen of the second display unit 112. In particular, the user does not need to separately perform an operation of setting the processing mode.

It is to be noted that processing of each unit may be implemented by recording a program for implementing all or some of the functions of the control unit 180 on a computer-readable recording medium and causing a computer system to read and execute the program recorded on the recording medium. It is to be noted that the "computer system" referred to here is assumed to include an operating system (OS) and hardware such as peripheral devices.

In addition, the "computer system" is assumed to include a homepage providing environment (or displaying environment) when a World Wide Web (WWW) system is used.

In addition, the "computer-readable recording medium" refers to a storage apparatus including a portable medium such as a flexible disk, a magneto-optical disc, a read only memory (ROM), and a compact disc (CD)-ROM, and a hard disk embedded in the computer system. Furthermore, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium for holding the program for a fixed time such as a volatile memory inside the computer system serving as a server or a client. In addition, the above-described program may implement some of the above-described functions, or the program may implement the above-described functions in combination with a program already recorded on the computer system.

Although the exemplary embodiments of the present invention have been described above in detail with reference to the drawings, specific configurations are not limited to the exemplary embodiments, and a design change and the like may also be included without departing from the gist of the present invention.

This application is based upon and claims the benefit of priority from Japanese Patent Application No. 2011-210976, filed on Sep. 27, 2011, the disclosure of which is incorporated herein in its entirety by reference.

INDUSTRIAL APPLICABILITY

The present invention is applicable to various portable electronic devices. The present invention can reduce time and effort of a user while performing mode switching that reflects the user's intention.

DESCRIPTION OF REFERENCE SIGNS

100 Portable terminal apparatus
111 First display unit
112 Second display unit
121 First touch sensor
122 Second touch sensor
131 Sound input unit
132 Sound output unit
140 Wireless communication unit
180 Control unit
181 Display control unit
182 Input processing unit
183 Sound processing unit
184 Communication control unit
185 Processing unit
190 Storage unit

The invention claimed is:

1. A portable electronic device comprising:
 a first touch sensor;
 a second touch sensor; and
 a processing unit which performs a first process when the first touch sensor detects a touch operation and performs a second process related to the first process in place of the first process when the first touch sensor detects the touch operation and the second touch sensor detects a touch operation.

2. The portable electronic device according to claim 1, comprising a display unit including a display screen,
 wherein the first touch sensor detects a touch operation on the display screen,
 when an image component which is an image serving as a component constituting a screen image which is an image displayed on the display screen is included in the screen image, the processing unit performs a process of varying a position of the image component in the screen image as the first process if the first touch sensor detects the touch operation serving as the operation of varying the position of the image component, and
 when the image component is included in the screen image, the processing unit performs a process of scrolling the screen image as the second process if the first touch sensor detects the touch operation serving as the operation of varying the position of the image component and the second touch sensor detects the touch operation.

3. The portable electronic device according to claim 2, wherein the processing unit performs the first process when the first touch sensor detects the touch operation and performs a third process in place of the second process or in addition to the second process when the first touch sensor detects the touch operation, the second touch sensor detects the touch operation, and at least one of the first touch sensor and the second touch sensor detects touch operations at a plurality of positions.

4. The portable electronic device according to claim 1, wherein when the first touch sensor detects the touch operation serving as a user authentication request operation, the processing unit performs authentication of a user and performs a process of permitting access to first data from a predetermined program as the first process if the authentication is successful, and when the first touch sensor detects the touch operation serving as the user authentication request operation and the second touch sensor detects the touch operation, the processing unit performs the authentication of the user and performs a process of permitting access to second data from the predetermined program as the second process if the authentication is successful.

5. The portable electronic device according to claim 4, wherein the processing unit performs the first process when the first touch sensor detects the touch operation and performs a third process in place of the second process or in addition to the second process when the first touch sensor detects the touch operation, the second touch sensor detects the touch operation, and at least one of the first touch sensor and the second touch sensor detects touch operations at a plurality of positions.

6. The portable electronic device according to claim 1, comprising a display unit including a display screen, wherein the first touch sensor detects the touch operation on the display screen, when the first touch sensor detects the touch operation serving as a scrolling operation, the processing unit performs a process of scrolling a screen image which is an image displayed on the display screen by a set scrolling amount as the first process, and when the first touch sensor detects the touch operation serving as the scrolling operation and the second touch sensor detects the touch operation, the processing unit performs a process of scrolling the screen image which is the image displayed on the display screen by a scrolling amount different from the scrolling amount in the first process as the second process.

7. The portable electronic device according to claim 6, wherein the processing unit performs the first process when the first touch sensor detects the touch operation and performs a third process in place of the second process or in addition to the second process when the first touch sensor detects the touch operation, the second touch sensor detects the touch operation, and at least one of the first touch sensor and the second touch sensor detects touch operations at a plurality of positions.

8. The portable electronic device according to claim 1, wherein the processing unit performs the first process when the first touch sensor detects the touch operation and performs a third process in place of the second process or in addition to the second process when the first touch sensor detects the touch operation, the second touch sensor detects the touch operation, and at least one of the first touch sensor and the second touch sensor detects touch operations at a plurality of positions.

9. A touch operation processing method of a portable electronic device which comprises a first touch sensor and a second touch sensor, the touch operation processing method comprising:

performing a first process when the first touch sensor detects a touch operation; and performing a second process related to the first process in place of the first process when the first touch sensor detects the touch operation and the second touch sensor detects a touch operation.

10. A non-transitory computer-readable recoding medium storing a program for causing a computer serving as a portable electronic device which comprises a first touch sensor and a second touch sensor to execute the processing steps of:

performing a first process when the first touch sensor detects a touch operation; and performing a second process related to the first process in place of the first process when the first touch sensor detects the touch operation and the second touch sensor detects a touch operation.

* * * * *